(12) United States Patent
Weng et al.

(10) Patent No.: US 7,656,495 B2
(45) Date of Patent: Feb. 2, 2010

(54) LIQUID CRYSTAL DISPLAY PANEL AND MANUFACTURE METHOD THEREOF

(75) Inventors: Chih-Hsiung Weng, Hsinchu (TW); Chih-Chieh Chang, Hsinchu (TW); Pin-Chun Wu, Hsinchu (TW); Tsung-Yuan Chang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 89 days.

(21) Appl. No.: 11/870,399

(22) Filed: Oct. 10, 2007
(Under 37 CFR 1.47)

(65) Prior Publication Data

US 2008/0116469 A1 May 22, 2008

(30) Foreign Application Priority Data

Nov. 17, 2006 (TW) ............... 95142538 A

(51) Int. Cl.
*G02F 1/1339* (2006.01)
(52) U.S. Cl. ............ 349/153; 349/155; 349/190
(58) Field of Classification Search ........... 349/153, 349/190
See application file for complete search history.

(56) References Cited

U.S. PATENT DOCUMENTS 6,466,294 B1 * 10/2002 Yamagishi et al. .......... 349/155

2005/0238853 A1   10/2005 Kim et al.

FOREIGN PATENT DOCUMENTS

JP        9-90372        4/1997

* cited by examiner

*Primary Examiner*—Richard H Kim
(74) *Attorney, Agent, or Firm*—J.C. Patents

(57) ABSTRACT

A liquid crystal display (LCD) panel, including a first substrate, a second substrate, a liquid crystal layer, a patterned sealant, several first stop structures, several second stop structures and several seal spacers, is provided. The first substrate is opposite to the second substrate. The liquid crystal layer and the patterned sealant surrounding it are disposed between the first substrate and the second substrate. The first stop structures disposed inside the patterned sealant surround the liquid crystal layer. Each second stop structure disposed inside the patterned sealant is located next to one of the first stop structures. The height H1 of each first or second stop structure is smaller than the distance H2 between the first and second substrates. The seal spacers are disposed inside the patterned sealant and located between the first and the second stop structures. A manufacture method of the LCD panel thereof is further provided.

17 Claims, 2 Drawing Sheets

LIQUID CRYSTAL DISPLAY PANEL AND MANUFACTURE METHOD THEREOF

CROSS-REFERENCE TO RELATED APPLICATION

This application claims the priority benefit of Taiwan application serial no. 95142538, filed Nov. 17, 2006. All disclosure of the Taiwan application is incorporated herein by reference.

BACKGROUND OF THE INVENTION

1. Field of the Invention

The present invention relates to a display device, especially to a liquid crystal display panel (LCD panel) and a manufacture method thereof.

2. Description of Related Art

The rapid development of the multi-media society mostly results from the fact that the semiconductor element or the display device has progressed by leaps and bounds. Taking the display device for an example, the cathode ray tube (CRT) has enjoyed the monopoly of the display device market in recent years due to its excellent display quality and low cost. However, the CRT still creates many problems for its occupation of large space and high power consumption. The CRT cannot effectively meet the demands on features such as light weight, thinness, small size and low power consumption. As a result, the liquid crystal display (LCD), with its high picture quality, good spatial utilization, low power consumption and radiation-free operation and other distinguished features, has become the mainstream in the display device market.

FIG. 1 is a schematic diagram of a conventional LCD panel. Referring to FIG. 1, a conventional LCD panel 100 includes a color filter substrate 110, a thin film transistor (TFT) array substrate 120, a liquid crystal layer 130 disposed between the color filter substrate 110 and the TFT array substrate 120, and a patterned sealant 140 surrounding the liquid crystal layer 130. Generally speaking, the method for forming the patterned sealant 140 is the following steps. After an unsolidified sealant being coated on the color filter substrate 110 and the TFT array substrate 120 and the color filter substrate 110 being assembled, a heating process and a pressurizing process are performed on the unsolidified sealant to solidify it.

However, during the heating process and the pressurizing process, the viscosity of the unsolidified sealant is lowered because of the heat, and flows around under the pressure. As a result, the thickness of the patterned sealant is difficult to control, which leads to uneven heights in different parts of the patterned sealant 140 (for instance, D1 is higher than D2). In addition, the distance between the TFT array substrate 120 and the color filter substrate 110 is related to the height of the patterned sealant 140. Therefore, the uneven thickness of the patterned sealant 140 will lead to uneven distances on the edges between the TFT array substrate 120 and the color filter substrate 110. The situation thus results in the phenomenon of edge mura when the LCD panel displays images.

SUMMARY OF THE INVENTION

The present invention is related to an LCD panel to mitigate the phenomenon of edge mura of the conventional LCD panel.

The present invention is further related to a manufacture method of an LCD panel to mitigate the phenomenon of edge mura of the conventional LCD panel.

In order to achieve the above or other advantages, the invention provides an LCD panel including a first substrate, a second substrate, a liquid crystal layer, a patterned sealant, several first stop structures, several second stop structures and several seal spacers. The first substrate is opposite to the second substrate. The liquid crystal layer and the patterned sealant are disposed between the first substrate and the second substrate, and the liquid crystal layer is surrounded by the patterned sealant. Further, the first stop structures are disposed inside the patterned sealant and surround the liquid crystal layer. The second stop structures are disposed inside the patterned sealant and each second stop structure is respectively located next to one of the first stop structures. The height of each first stop structure or each second stop structure is H1, the distance between the first substrate and the second substrate is H2, and the height H1 of each first stop structure or each second stop structure is smaller than the distance H2 between the first substrate and the second substrate, H1<H2. The seal spacers are disposed inside the patterned sealant and located between the first stop structures and the second stop structures.

In one embodiment of the present invention, the first stop structures are disposed on the first substrate, and the second stop structures are disposed on the second substrate.

In one embodiment of the invention, the first stop structures and the second stop structures are disposed on the first substrate.

In one embodiment of the invention, each first stop structure or each second stop structure is respectively consisted of a first portion disposed on the first substrate and a second portion disposed on the second substrate, and the total height of the first and the second portions equals to H1.

In one embodiment of the invention, the first substrate is a color filter substrate. The first stop structures and the second stop structures are disposed on the first substrate, and the material of the first stop structures and the second stop structures can be the same as that of color filter layers of the color filter substrate.

In one embodiment of the invention, the first substrate is a color filter on array (COA) substrate, and the first stop structures and the second stop structures are disposed on the first substrate. The material of the first stop structures and the second stop structures can be the same as that of color filter layers of the COA substrate.

In one embodiment of the invention, the material of the first stop structures and the second stop structures may be photosensitive resin.

In one embodiment of the invention, the LCD panel further includes several spacers disposed between the first substrate and the second substrate and located inside the area confined by the patterned sealant. Moreover, the material of the first stop structures and the second stop structures may be the same as that of the spacers.

In one embodiment of the invention, the diameter of each seal spacer is H3, and the height H1 of each first stop structure or each second stop structure is larger than half of the diameter of each spacer, (½)H3<H1.

The invention also provides a manufacture method of an LCD panel. The method includes the following steps: First, a first substrate and a second substrate are provided, wherein the first substrate and the second substrate have a display area. Next, several first stop structures and second stop structures are formed surrounding the display area between the first substrate and the second substrate. Each second stop structure is respectively located next to one of the first stop structures. The height of each first stop structure or each second stop structure is H1, the distance between the first substrate and the second substrate is H2, and H1<H2. Afterwards, a patterned sealant and several seal spacers inside it are formed between the first stop structures and the second stop structures, and a liquid crystal layer is formed within the area confined by the patterned sealant between the first substrate and the second substrate.

In one embodiment of the invention, the means for forming the first stop structures and the second stop structures may be forming the first stop structures on the first substrate, and forming the second stop structures on the second substrate.

In one embodiment of the invention, the means for forming the first stop structures and the second stop structures may be forming the first stop structures and the second stop structures on the first substrate.

In one embodiment of the invention, the means for forming the first stop structures and the second stop structures may be forming first portions of the first and the second stop structures on the first substrate, and forming second portions of the first and the second stop structures on the second substrate. The total height of the first portion and the second portion of each first stop structure equals to H1, and the total height of the first portion and the second portion of each second stop structure also equals to H1.

In one embodiment of the invention, the first substrate is a color filter substrate, and the first stop structures, the second stop structures and color filter layers of the color filter substrate are formed simultaneously.

In one embodiment of the invention, the first substrate is a COA substrate, and the first stop structures, the second stop structures and color filter layers of the COA substrate are formed simultaneously.

In one embodiment of the invention, the first substrate has several spacers, and the first stop structures, the second stop structures and the spacers are formed simultaneously.

Given that the LCD panel of the present invention has the first stop structures and the second stop structures, the seal spacers can be confined between the first stop structures and the second stop structures. When a heating process and a pressurizing process are performed, the excessive sealant coated in the spaces between the first stop structures and the second structures is forced to overflow to the outer side so as to prevent the excessive sealant from remaining between the seal spacers and the first substrate and/or between the seal spacers and the second substrate. Thus, the uniformity of the distance between the first substrate and the second substrate is improved such that the conventional problem of edge mura is mitigated.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
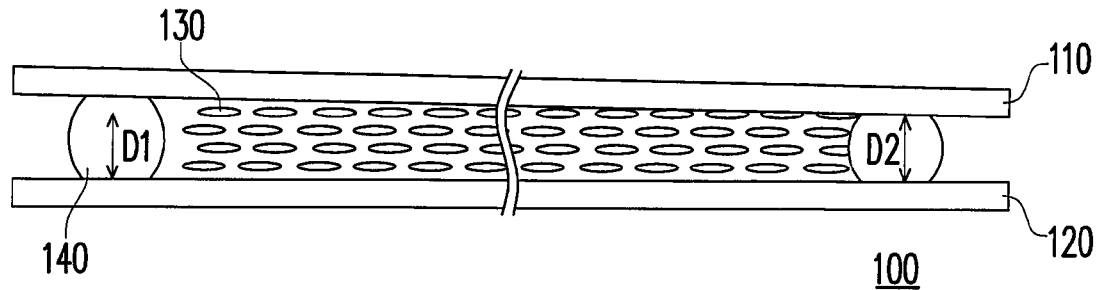
FIG. 1 is a schematic diagram of a conventional LCD panel.
Figure 2:
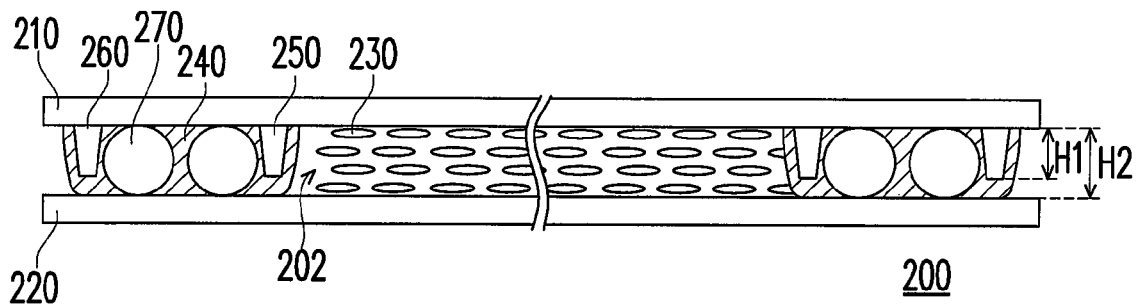
FIG. 2 is a schematic diagram of an LCD panel according to one embodiment of the present invention.
Figure 3:
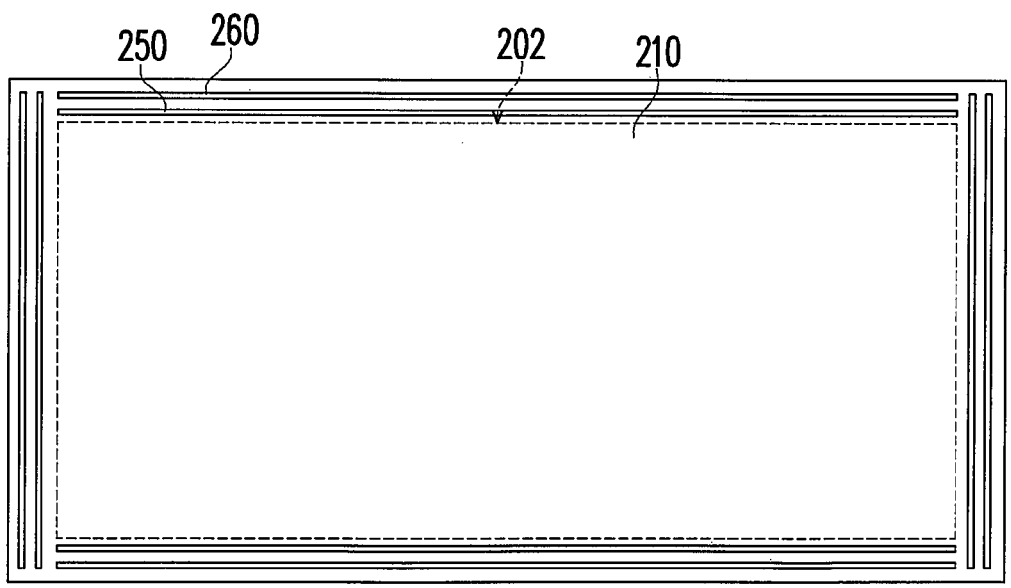
FIG. 3 is a schematic diagram of the first stop structures and the second stop structures on the first substrate in FIG. 2.

FIG. 2 is a schematic diagram showing an LCD panel in one embodiment of the invention, and FIG. 3 is a schematic diagram illustrating the first stop structures and the second stop structures on the first substrate in FIG. 2. Referring to FIGS. 2 and 3, the LCD panel 200 of the present embodiment includes a first substrate 210, a second substrate 220, a liquid crystal layer 230, a patterned sealant 240, several first stop structures 250, several second stop structures 260 and several seal spacers 270. The first substrate 210 is opposite to the second substrate 220. The liquid crystal layer 230 and the patterned sealant 240 are disposed between the first substrate 210 and the second substrate 220, and the liquid crystal layer 230 is surrounded by the patterned sealant 240. Further, the first stop structures 250 are disposed inside the patterned sealant 240, and surround the liquid crystal layer 230. The second stop structures 260 are disposed inside the patterned sealant 240 and each of the second stop structures 260 is respectively located next to one of the first stop structures 250. The seal spacers 270 are disposed inside the patterned sealant 240 and located between the first stop structures 250 and the second stop structures 260. Additionally, the height of each first stop structure or each second stop structure is H1, the distance between the first substrate 210 and the second substrate 220 is H2, and the height H1 of each first stop structure or each second stop structure is smaller than the distance H2 between the first substrate and the second substrate, H1<H2.

The manufacture method of the LCD panel 200 includes the following steps: First, the first substrate 210 and the second substrate 220 are provided, wherein the first substrate 210 and the second substrate 220 have a display area 202. Next, the first stop structures 250 and the second stop structures 260 are formed surrounding the display area 202 between the first substrate 210 and the second substrate 220. Afterwards, the patterned sealant 240 and the seal spacers 260 inside the patterned sealant 240 are formed between the first stop structures 250 and the second stop structures 260, and the liquid crystal layer 230 is formed within the area confined by the patterned sealant 240 between the first substrate 210 and the second substrate 220.

In the present embodiment, the first stop structures 250 and the second stop structures 260 may be formed on the first substrate 210. Moreover, in the embodiment the unsolidified sealant and the seal spacers 260 are formed between the first stop structures 250 and the second stop structures 260, and then a heating process and a pressurizing process are performed to solidify the unsolidified sealant. When the heating process and the pressurizing process are performed, the unsolidified sealant tends to flow around, and the seal spacers 270 tend to flow with the unsolidified sealant. However, the first stop structures 250 and the second stop structures 260 can confine the seal spacers 270 within the space between the first stop structures 250 and the second stop structures 260. Therefore, the seal spacers 270 do not flow around with the unsolidified sealant. Additionally, in the embodiment, in order to prevent the seal spacers 270 from moving around, the height H1 of each first stop structure 250 or each second stop structure 260 can be adjusted as bigger or larger than half of the diameter H3 of each seal spacer 270, i.e. ($\frac{1}{2}$)H3<H1.

According to the above description, given that the height H1 of each first stop structure 250 or each second stop structure 260 is lower or smaller than the distance H2 between the first substrate 210 and the second substrate 220, spaces exist between each of the first stop structures 250 and the second substrate 220, and spaces also exist between each of the second stop structures 260 and the second substrate 220. Since when the heating process and the pressurizing process are performed, the excessive unsolidified sealant can flow out from these spaces so as to prevent the excessive sealant from remaining between the seal spacers 270 and the first substrate 210 and/or between the seal spacers 270 and the second substrate 220. Hence, in the LCD panel 200 of the present embodiment, the distance between the first substrate 210 and the second substrate 220 is more uniform, such that the conventional problem of edge mura is mitigated. Further, the unsolidified sealant overflowing from the spaces flows along the side walls of the first stop structures 250 and the second stop structures 260, and adheres to the side walls of the first stop structures 250 and the second stop structures 260 after being solidified, which enhances the viscosity of the patterned sealant 240.

In the present invention, the first stop structures 250 and the second stop structures 260 are not limited to being located on the same substrate. Some other embodiments with accompanying drawings are cited in the following to demonstrate different dispositions of the first stop structures 250 and the second stop structures 260.

Figure 4:
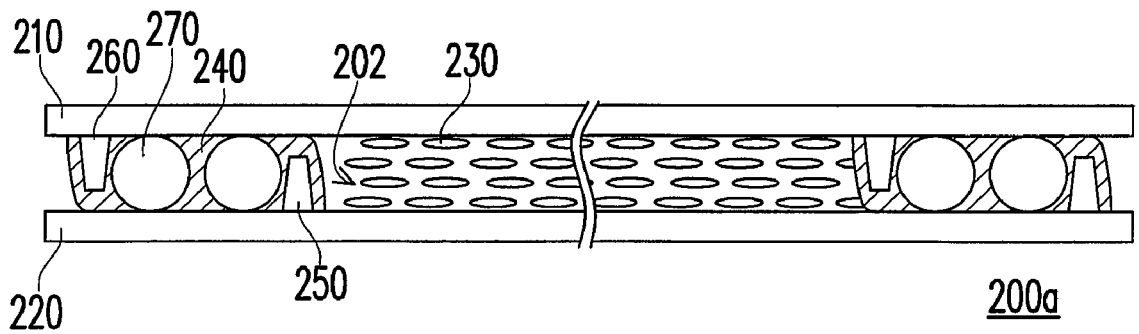
FIGS. 4 and 5 are schematic diagrams showing LCD panels of another two embodiments of the invention.
Figure 5:
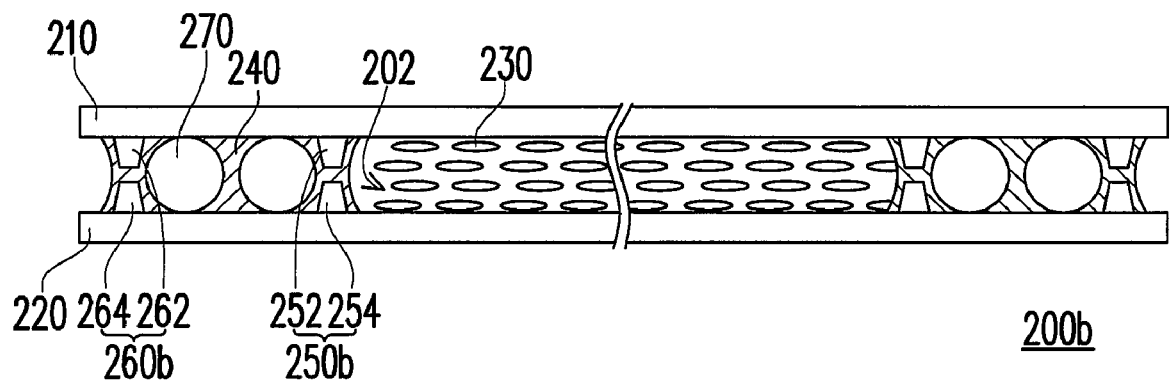

FIGS. 4 and 5 are schematic diagrams showing the LCD panels of the other two embodiments of the invention. First referring to FIG. 4, an LCD panel 200a is similar to the LCD panel 200 in FIG. 2. The difference between the two panels lies in that in the LCD panel 200a, the first stop structures 250 are formed on the second substrate 220, and the second stop structures 260 are formed on the first substrate 210. In other words, the first stop structures 250 and the second stop structures 260 can be respectively located on one of the first substrate 210 and the second substrate 220.

Referring to FIG. 5, the LCD panel 200b is similar to the LCD panel 200 in FIG. 2. The difference between the two panels lies in that each first stop structure 250b in the LCD panel 200b is consisted of a first portion 252 formed on the first substrate 210 and a second portion 254 formed on the second substrate 220, and each second stop structure 260b is consisted of a first portion 262 formed on the first substrate 210 and a second portion 264 formed on the second substrate 220. Besides, the first portion 252 and the second portion 254 of each first stop structure 250b may be opposite to each other, and the total height of the first portion 252 and the second portion 254 is equal to the height H1. The first portion 262 and the second portion 264 of each second stop structure 260b may be opposite to each other, and the total height of the first portion 262 and the second portion 264 is equal to the height H1. As regards the advantages of the LCD panels 200a and 200b, they are similar to those of the LCD panel 200 and not to be reiterated herein.

In the invention, the material of the first stop structures 250 and the second stop structures 260 may be photosensitive resin, yet not limited to it. Furthermore, the manufacture method for the first stop structures 250 and the second stop structures 260 may be integrated with the manufacture processes of the TFT array substrate, the color filter substrate or the COA substrate, or other methods.

Figure 6:
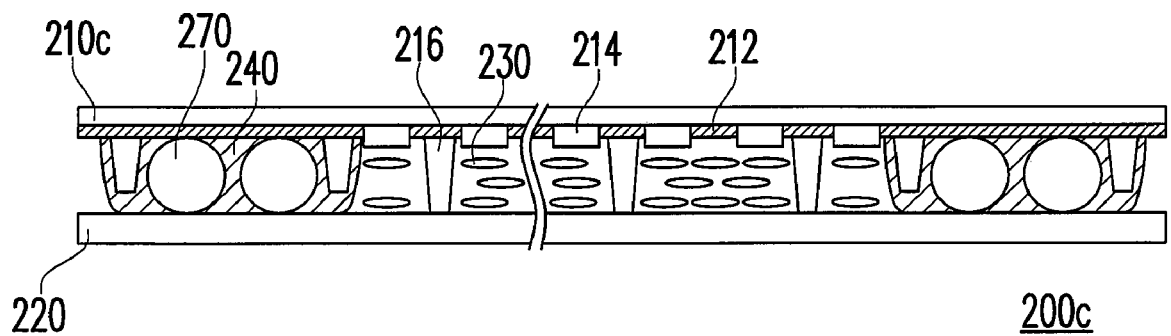
FIG. 6 is a schematic diagram showing an LCD panel of another embodiment of the invention.

FIG. 6 is a schematic diagram showing the LCD panel of another embodiment of the invention. Referring to FIG. 6, the first substrate 210c of the LCD panel 200c is a color filter substrate, and the second substrate 220 is a TFT array substrate. The first substrate 210c has a black matrix 212 and a plurality of color filter layers 214, and the first stop structures 250 and the second stop structures 260 may be disposed on the black matrix 212. In addition, the first stop structures 250 and the second stop structures 260 may be formed simultaneously as the color filter layers 214. For instance, the color filter layers 214, the first stop structures 250 and the second stop structures 260 may be manufactured in the same photolithography process. Hence, the material of the first stop structures 250 and the second stop structures 260 can be the same as that of the color filter layers 214 in the invention.

Furthermore, the first substrate 210c may further include a plurality of spacers 216 thereon for maintaining the distance between the first substrate 210c and the second substrate 220. The seal spacers 270 may be replaced by the spacers 216 with the same location between the first stop structures 250 and the second stop structure 260. The first stop structures 250 and the second stop structures 260 may also be formed simultaneously as the spacers 216. In other words, the same photolithography process can be utilized for manufacturing the spacers 216, the first stop structures 250 and the second stop structures 260 in the present embodiment. Thus, the material of the first stop structures 250 and the second stop structures 260 can be the same as that of the spacers 216 in the invention.

It is noted that the first substrate 210c of the LCD panel 200c in the embodiment may also be a COA substrate and the second substrate 220 may be a transparent substrate.

Since the manufacture method for the first stop structures 250 and the second stop structures 260 can be integrated with the manufacture processes of the color filter substrate, the TFT array substrate or the COA substrate, no additional costs for materials and production time are introduced.

In summary, the LCD panel and the manufacture method thereof provided in the present invention have at least the following advantages:

1. The first stop structures and the second stop structures confine the seal spacers between the first stop structures and the second stop structures, and the excessive sealant coated between the first stop structures and the second stop structures overflows from the spaces to the outer side so as to prevent the excessive sealant from remaining between the seal spacers and the first substrates and/or between the seal spacers and the second substrates. Hence, the uniformity of the distance between the first substrate and the second substrate is increased such that the conventional problem of edge mura in the LCD panel is mitigated.

2. The unsolidified sealant overflowing from the spaces flows along the side walls of the first stop structures and the second stop structures, and adheres to the side walls of the first stop structures and the second stop structures after being solidified, which enhances the viscosity of the patterned sealant.

3. The manufacture method for the first stop structures and the second stop structures can be integrated with the manufacture processes of the color filter substrate or the TFT array substrate to reduce the production cost.

Although the present invention has been disclosed above by the preferred embodiments, they are not intended to limit the present invention. Anybody skilled in the art can make some modifications and alteration without departing from the spirit and scope of the present invention. Therefore, the protecting range of the present invention falls in the appended claims.

What is claimed is:

1. A liquid crystal display (LCD) panel, comprising:
a first substrate;
a second substrate, opposite to the first substrate;
a liquid crystal layer, disposed between the first substrate and the second substrate;
a patterned sealant, disposed between the first substrate and the second substrate and surrounding the liquid crystal layer;

a plurality of first stop structures, disposed inside the patterned sealant and surrounding the liquid crystal layer;

a plurality of second stop structures, disposed inside the patterned sealant and respectively located next to one of the first stop structures, wherein the first stop structures and the second stop structures are substantially parallel to each other and are disposed at two edges of the patterned sealant and surround the patterned sealant, and the height H1 of each first stop structure or each second stop structure is smaller than the distance H2 between the first substrate and the second substrate, H1<H2; and a plurality of seal spacers, disposed inside the patterned sealant and located between the first stop structures and the second stop structures.

2. The LCD panel as claimed in claim 1, wherein the first stop structures are disposed on the first substrate and the second stop structures are disposed on the second substrate.

3. The LCD panel as claimed in claim 1, wherein the first stop structures and the second stop structures are disposed on the first substrate.

4. The LCD panel as claimed in claim 3, wherein the first substrate is a color filter substrate, and the material of the first stop structures and the second stop structures is the same as that of color filter layers of the color filter substrate.

5. The LCD panel as claimed in claim 3, wherein the first substrate is a color filter on array (COA) substrate, and the material of the first stop structures and the second stop structures is the same as that of color filter layers of the COA substrate.

6. The LCD panel as claimed in claim 1, wherein each first stop structure or each second stop structure is respectively consisted of a first portion disposed on the first substrate and a second portion disposed on the second substrate, and the total height of the first portion and the second portion is H1.

7. The LCD panel as claimed in claim 1, wherein the material of the first stop structures and the second stop structures includes a photosensitive resin.

8. The LCD panel as claimed in claim 1, further comprising a plurality of spacers disposed between the first substrate and the second substrate and located within the area confined by the patterned sealant.

9. The LCD panel as claimed in claim 8, wherein the material of the first stop structures and the second stop structures is the same as that of the spacers.

10. LCD panel as claimed in claim 1, wherein the diameter of each spacer is H3, and the height H1 of each first stop structure or each second stop structure is larger than half of the diameter of each spacer, $(\frac{1}{2})H3 \leq H1$.

11. A manufacture method of an LCD panel, comprising:
providing a first substrate and a second substrate, wherein the first substrate and the second substrate have a display area;

forming a plurality of first stop structures and a plurality of second stop structures surrounding the display area between the first substrate and the second substrate, wherein each second stop structure is respectively located next to one of the first stop structures, the height H1 of each first stop structure or each second stop structure being smaller than the distance H2 between the first substrate and the second substrate, H1<H2; and forming a patterned sealant and a plurality of seal spacers inside the patterned sealant between the first stop structures and the second stop structures, forming a liquid crystal layer within the area confined by the patterned sealant between the first substrate and the second substrate, wherein the first stop structures and the second stop structures are substantially parallel to each other and are disposed at two edges of the patterned sealant and surround the patterned sealant.

12. The method as claimed in claim 11, wherein the method for forming the first stop structures and the second stop structures comprises:
forming the first stop structures on the first substrate, forming the second stop structures on the second substrate.

13. The method as claimed in claim 11, wherein the method for forming the first stop structures and the second stop structures comprises:
forming the first stop structures and the second stop structures on the first substrate.

14. The method as claimed in claim 13, wherein the first substrate is a color filter substrate, and the first stop structures, the second stop structures and color filter layers of the color filter substrate are formed simultaneously.

15. The method as claimed in claim 13, wherein the first substrate is a COA substrate, and the first stop structures, the second stop structures and color filter layers of the COA substrate are formed simultaneously.

16. The method as claimed in claim 11, wherein the method for forming the first stop structures and the second stop structures comprises:
forming first portions of the first stop structures and the second stop structures on the first substrate, forming second portions of the first stop structures and the second stop structures on the second substrate, the total height of the first and second portions of each first stop structure being equal to the height H1, the total height of the first and second portions of each second stop structure being equal to the height H1.

17. The method as claimed in claim 11, wherein the first substrate has a plurality of spacers, and the first stop structures, the second stop structures and the spacers are formed simultaneously.

* * * * *